United States Patent [19]
Drent

[11] Patent Number: 5,006,640
[45] Date of Patent: Apr. 9, 1991

[54] POLYKETONE WITH UNSATURATED TERMINAL GROUPS

[75] Inventor: Eit Drent, Amsterdam, Netherlands

[73] Assignee: Shell Oil Company, Houston, Tex.

[21] Appl. No.: 463,706

[22] Filed: Jan. 11, 1990

Related U.S. Application Data

[62] Division of Ser. No. 271,130, Nov. 14, 1988, Pat. No. 4,921,938.

[30] Foreign Application Priority Data

Nov. 12, 1987 [NL] Netherlands .......................... 8702705

[51] Int. Cl.$^5$ .............................................. C08G 67/02
[52] U.S. Cl. .................................................... 528/392
[58] Field of Search ........................................... 528/392

[56] References Cited

U.S. PATENT DOCUMENTS

| 2,495,286 | 1/1950 | Brubaker | 260/63 |
|---|---|---|---|
| 3,694,412 | 9/1972 | Nozaki | 260/63 CQ |
| 3,984,388 | 10/1976 | Shryne et al. | 260/63 CQ |
| 4,843,144 | 6/1989 | Van Broekhoven et al. | 528/392 |
| 4,880,903 | 11/1989 | Van Broekhoven et al. | 528/392 |
| 4,904,759 | 2/1990 | Drent | 528/392 |

FOREIGN PATENT DOCUMENTS

| 121965 | 10/1984 | European Pat. Off. . |
|---|---|---|
| 181014 | 5/1986 | European Pat. Off. . |
| 222454 | 5/1987 | European Pat. Off. . |
| 257663 | 3/1988 | European Pat. Off. . |
| 1081304 | 8/1967 | United Kingdom . |

Primary Examiner—Harold D. Anderson

[57] ABSTRACT

Contacting carbon monoxide and at least one α-olefin in a diluent comprising at least 50% by volume of an aprotic polar compound in the presence of a catalyst formed by contacting a palladium compound, the anion of an acid having a pKa less than 4 and a bidentate phosphorus ligand results in the production of novel polyketone polymers having unsaturated end groups.

7 Claims, No Drawings

POLYKETONE WITH UNSATURATED TERMINAL GROUPS

This is a division of application Ser. No. 271,130, filed Nov. 14, 1988, now U.S. Pat. No. 4,921,938.

This invention relates to novel alternating polymers of carbon monoxide with one or more olefinically unsaturated compounds.

Polymers of carbon monoxide and one or more ethylenically unsaturated hydrocarbons are well known. Such polymers contain carbonyl groups in the polymer backbone and are known as polyketones. The polymers are useful in part because at least a portion of the carbonyl groups can be converted by conventional chemical reactions into other functional groups, e.g., conversion into polyamines by reaction with ammonia and conversion into polyols by catalytic hydrogenation. The polyketone polymers independently have utility as will be described.

The carbon monoxide polymers produced by polymerization of carbon monoxide and ethylenically unsaturated hydrocarbons such as ethylene are generally high molecular weight linear alternating polymers having one unit of carbon monoxide per unit of hydrocarbon. The polymers are typically produced employing a catalyst comprising certain Group VIII metal compounds, e.g., a palladium compound, an anion of an acid with a pKa less than 4, and a bidentate phosphorus ligand represented by the formula $R^1R^2\text{-P-R-P-}R^3R^4$ wherein $R^1$, $R^2$, $R^3$ and $R^4$ independently are organic radicals, but preferably are similar, and R is a bivalent organic bridging group having at least two carbon atoms in the bridge. When the olefinically unsaturated hydrocarbon is ethylene, the polymers are inexpensive and provide good mechanical properties of strength, stiffness and impact resistance.

The preparation of the polymers by using the above-described catalyst compositions may be carried out by contacting the monomers at an elevated temperature and pressure with a solution of the catalyst composition in a protic polar diluent in which the polymers are insoluble or virtually insoluble. During the polymerization, the polymers are obtained in the form of a suspension in the diluent. After the desired degree of polymerization is reached, the polymerization is generally terminated by cooling and releasing the pressure. The polymers can be isolated from the suspension for instance by means of filtration or centrifugation. Lower aliphatic alcohols, such as methanol have been found to be very suitable protic polar diluents.

The type of diluent used has an effect on the terminal groups occurring in the polymers. Thus, when carbon monoxide is polymerized with ethene in methanol as the diluent and by using the above-mentioned catalyst compositions, the resulting polymers will be substantially polymers which can be represented by the formula $CH_3-CH_2-CO-(C_2H_4-CO-)_n-CH_2-CH_2-CO-OCH_3$, i.e. polymers whose molecules substantially bear an alkyl keto group at one end and an alkyl ester group at the other end. With a view to the possible uses of the polymers, it is desirable that either one of the terminal groups in at least part of the polymer molecules should contain an olefinically unsaturated double bond, so that the polymers can be suitably used as a component in radical polymerization processes with olefinically unsaturated monomers or with blefinically unsaturated polymers.

The Applicant has determined that conversion of the alkyl ester groups which occur in the polymers as terminal groups into hydroxyl groups by means of catalytic hydrogenation followed by catalytic dehydration is not a suitable route to the introduction of an olefinically unsaturated double bond into either one of the terminal groups of the polymer molecules. Owing to various side reactions, for instance the deterioration of carbonyl groups present in that polymer molecules, the polymer mixture formed will be one in which much of the linear character of the polymers is lost, while the introduction of an olefinically unsaturated double bond into either of the two terminal groups of the polymer molecules remains minimal.

SUMMARY OF THE INVENTION

The present invention includes certain novel polymers and a process of producing the polymers. More particularly, the polymers of the invention are polymers of carbon monoxide and at least one α-olefin with at least a portion of the polymer molecules having a carbon-carbon double bond in either of the two terminal groups. The polymers are linear alternating polymers of carbon monoxide with the α-olefin, the polymers having primarily units of the type —CO—(A)—wherein A is a polymer component resulting from polymerization of the α-olefin. Polymer component A preferably contains less than 10 carbon atoms and most preferably ethylene is used to produce the polymer.

The polymers of the invention are produced by contacting the monomers in a diluent consisting of more than 50 % by volume of one or more aprotic polar compounds and in the presence of a catalyst comprising certain Group VIII metal compounds, e.g., a palladium compound, an anion of an acid with a pKa less than 4, and a bidentate phosphorus ligand represented by the formula $R^1, R^2\text{—P-R-P-}R^3R^4$ wherein $R^1$, $R^2$, $R^3$ and $R^4$ independently are organic radicals, but preferably are similar, and R is a bivalent organic bridging group having at least two carbon atoms in the bridge. Preferred aprotic polar compounds for providing the unsaturated terminal groups are dimethyl sulfoxide and N-methyl-2-pyrrolidone. The polymerization of carbon monoxide with ethylene in dimethyl sulphoxide as the diluent and using catalyst compositions as mentioned hereinbefore will lead to polymers which can be represented substantially by the following formula $CH_3-CH_2-CO-(C_2H_4-CO-)_n-CH_2-CH_2-CO-CH=CH_2$, i.e. polymers whose molecules substantially bear an alkyl keto group at one end and a vinyl keto group at the other end.

Preferably, more than 25% of the polymer molecules, and in particular more than 40% of the polymer molecules of the polymers of the invention contain an olefinically unsaturated double bond in either of the two terminal groups.

DESCRIPTION OF THE INVENTION

The polymers of the invention are linear alternating polymers of carbon monoxide and at least one α-olefin with at least a portion of the polymer molecules having a carbon-carbon double bond in either of the two terminal groups. The polymers are linear alternating polymers of carbon monoxide with the α-olefin, the polymers having primarily units of the type —CO—(A)— wherein A is a polymer component resulting from polymerization of the α-olefin.

The α-olefins employed to produce the units containing component A have from 2 to 20, but preferably 2 to 10, carbon atoms inclusive. Useful α-olefins are ethylene, propylene, and 1-butene. Polymerization is most easily accomplished when a single o-olefin is employed and particularly useful is ethylene.

The process of the invention comprises contacting carbon monoxide and the α-olefin in the presence of a catalyst composition formed by contacting a palladium compound, an anion of an acid having a pKa (determined in aqueous solution at 18° C.) less than 4, preferably less than 2, and a bidentate phosphorus ligand represented by the formula $R^1R^2$-P-R-P-$R^3R^4$ wherein $R^1$, $R^2$, $R^3$ and $R^4$ independently are organic radicals which may or may not be aryl groups, but preferably are similar aryl groups, and R is a bivalent organic bridging group having at least two carbon atoms in the bridge.

The palladium compound employed in the catalyst compositions is a palladium salt and preferably a palladium carboxylate such as palladium acetate. The anion is an anion of an acid having a pKa less than about 4, such as mineral acids including perchloric acid, sulfuric acid, phosphoric acid, and nitrous acid, sulfonic acids including methanesulfonic acid, trifluoromethanesulfonic acid, 2-hydroxypropane-2-sulionic acid, and para-toluenesulfonic acid, and carboxylic acids including trichloroacetic acid, dichloroacetic acid, trifluoroacetic acid, difluoroacetic acid, tartaric acid, and Z,5-dihydroxybenzoic acid. Anions of acids having a pKa less than 2 are prefered and in particular anions of sulfonic acids or carboxylic acids, such as para-toluenesulfonic acid or trifluoroacetic acid, respectively.

The anion is present in the catalyst composition in an amount from about 0.5 to about 200 equivalents per gram atom of palladium and preferably from about 1 to about 100 equivalents per gram atom of palladium. The anion is provided as the acid or as a salt of a non-noble transition metal such as zirconium, vanadium, chromium, iron, nickel, copper or zinc. When the anion is provided as the salt of a non-noble transition metal, a copper salt is prefered. Optionally, the palladium compound and the anion of the acid can be supplied as a single compound such as palladium para-tosylate, having the formula Pd($CH_3CN)_2(O_3S$—$C_6H_4$—$CH_3)_2$, which is prepared by reaction of palladium chloride with the silver salt oi para-toluenesulfonic acid in acetonitrile as the solvent or by reaction oi palladium acetate and para-toluenesulfonic acid in acetonitrile as solvent.

In the phosphorus bidentate ligands having the formula $R^1R^2$-P-R-$R^3R^4$ as described above, the preferred R group contains 3 atoms in the bridge with at least two of the atoms being carbon atoms. Examples of suitable bridging groups R are the —$CH_2$—$CH_2$—$CH_2$—group, and the —$CH_2$—$C(CH_3)_2$—$CH_2$—group, the —$CH_2$—$Si(CH_3)_2$—$CH_2$—group, and the —$CH_2$—$C(R_5)(R_6)$—$CH_2$— group in which $R_5$ represents a methyl group and $R_6$ represents a diphenylphosphinomethyl group. A very suitable phosphine ligand is 1,3-bis(diphen)lphosphino)propane. By preference, the phosphorus bidentate ligands are used in a quantity from about 0.1 to about 3 mol per mol of palladium compound, preferably from about( 0.75 mol to about 3 mol per mol of palladium compound.

The preparation of the polymers of the invention is carried out in a diluent whIch comprises more than 50% by volume of one or more aprotic polar compounds. Preferably, the diluent used comprises more than 75% by volume of one or more aprotic polar compounds. Examples of suitable aprotic polar diluent are dimethyl sulfoxide, N-methyl-Z-pyrrolidone, N,N-dimethyl acetamide, and an acetonitrile. Preferred aprotic polar diluents are dimethyl sulioxide and N-methyl-2-pyrrolidone. In addition to one or more aprotic polar compounds, the diluent used may also include one or more other compounds. Examples of such compounds are alcohols, such as isopropanol, and ketones, such as acetone.

The catalyst composition useful in the process of the invention is employed in quantities from about $1 \times 10^{-7}$ mol to about $1 \times 10^{-3}$ gram atom of palladium per mol of α-olefin are satisfactory with quantities containing from about $1 \times 10^{-6}$ to about $1 \times 10^{-4}$ gram atom of palladium per mol of the o-olefin being preferred. The molar ratio of the olefinically unsaturated compounds relative to carbon monoxide is preferably 10:1 to 1:5 and most preferably 5:1 to 1:2.

The polymerization may be carried out either batchwise or continuous. In a typical polymerization, conditions employed include reaction temperatures from about 20° C. to about 200° C., preferably from about 30° C. to about 150° C. Typical reaction pressures vary from about 1 to about 200 bar, preferably from about 20 to about 100 bar. The carbon monoxide used in the polymerization may contain contaminants such as hydrogen, carbon dioxide, and nitrogen. The mechanical form of the reactor is not critical provided it maintains the desired polymerization conditions of temperature and pressure. Subsequent to polymerization, the terpolymer product is recovered by conventional means such as filtration or decantation.

ILLUSTRATIVE EMBODIMENT I

A carbon monoxide/ethylene copolymer was prepared by charging to a magnetically stirred autoclave of 250 ml capacity, a catalyst composition solution comprising 50 ml of dimethyl sulfoxide, 0.1 mmol of palladium acetate, 2 mmol of trifluoroacetic acid, and 0.15 mmol of 1,3-bis(diphenylphosphino)propane. After evacuation oi air present in the autoclave, ethylene under pressure was added until a pressure of 20 bar was reached. Then carbon monoxide was introduced under pressure until a total pressure of 50 bar was reached. The contents of the autoclave were heated and maintained at 80° C. After 5 hours the polymerization was terminated by cooling to room temperature and releasing pressure. The polymer was filtered, washed with methanol and dried in under vacuum at room temperature.

The polymerization rate was 160 grams of copolymer per gram of palladium per hour. The copolymer contained unsaturated terminal groups at least at one end in about 70 % of the polymer molecules on the average.

ILLUSTRATIVE EMBODIMENT II

The procedure of Illustrative Embodiment I was repeated except that (a) the catalyst solution contained 50 ml of N-methyl-2-pyrrolidone and 5 ml of isopropyl alcohol instead of dimethyl sulfoxide, and (b) the reaction time was 3 hours.

The polymerization rate was 460 grams of copolymer per gram of palladium per hour. The copolymer contained unsaturated terminal groups at least at one end in about 90 % of the polymer molecules on the average.

ILLUSTRATIVE EMBODIMENT III

The procedure of Illustrative Embodiment I was repeated except that the catalyst solution contained 50 ml of N-methyl-2-pyrrolidone instead of dimethyl sulfoxide.

The polymerization rate was 360 grams of copolymer per gram of palladium per hour. The copolymer contained unsaturated terminal groups at least at one end in about 100 % of the polymer molecules on the average.

ILLUSTRATIVE EMBODIMENT IV

The procedure of Illustrative Embodiment I was repeated except that (a) the catalyst solution contained 50 ml of N-methyl-2-pyrrolidone and 10 ml of acetone instead of dimethyl sulfoxide, and lb) the reaction time was 1 hour.

The polymerization rate was 740 grams of copolymer per gram of palladium per hour. The copolymer contained unsaturated terminal groups at least at one end in about 90 % of the polymer molecules on the average.

ILLUSTRATIVE EMBODIMENT V

The procedure of Illustrative Embodiment I was repeated except that (a) the catalyst solution contained 50 ml of N-methyl-2-pyrrolidone and 5 ml of isopropyl alcohol instead of dimethyl sulfoxide, and 0.5 mmol of para-toluenesulfonic acid instead of trifluoroacetic acid, and (b) the reaction time was 2.5 hours.

The polymerization rate was 300 grams of copolymer per gram of palladium per hour. The copolymer contained unsaturated terminal groups at least at one end in about 50 % of the polymer molecules on the average.

With the aid of $^{13}$C-NMR analysis it was established that the copolymers prepared according to Illustrative Embodiments I-V had a linear structure and were made up of the units $-CO-(C_2H_4)-$. It was further established that the copolymers had the indicated amount of unsaturated terminal groups.

What is claimed is:

1. A linear alternating polymer of carbon monoxide and at least one α-olefin, the polymer comprising:
   units of the formula $-CO-(A)-$ wherein A is a mer unit from one or more α-olefins; and
   a least one polymer molecule that terminates with at least one group containing a carbon-carbon double bond.

2. The polymer of claim 1 wherein A is a mer unit from an α-olefin having less than 10 carbon atoms.

3. The polymer of claim 1 wherein A is a mer unit of ethylene.

4. The polymer of claim 1 wherein more than 40% of the polymer molecule terminate with at least one group having a carbon-carbon double bond.

5. The polymer of claim 1 wherein more than 40% of the polymer molecules terminate with at least one group having a carbon-carbon double bond.

6. The polymer of claim 1 wherein more than 25% of the polymer molecules terminate with at least one $-CH=CH_2$ group.

7. The polymer of claim 1 wherein more than 40% of the polymer molecules terminate with at least one $-CH=CH_2$ group.

* * * * *